Feb. 20, 1962 C. L. ROBERSON 3,021,558
METHOD AND APPARATUS FOR PRODUCING FIBERS
Filed May 15, 1959 3 Sheets-Sheet 2

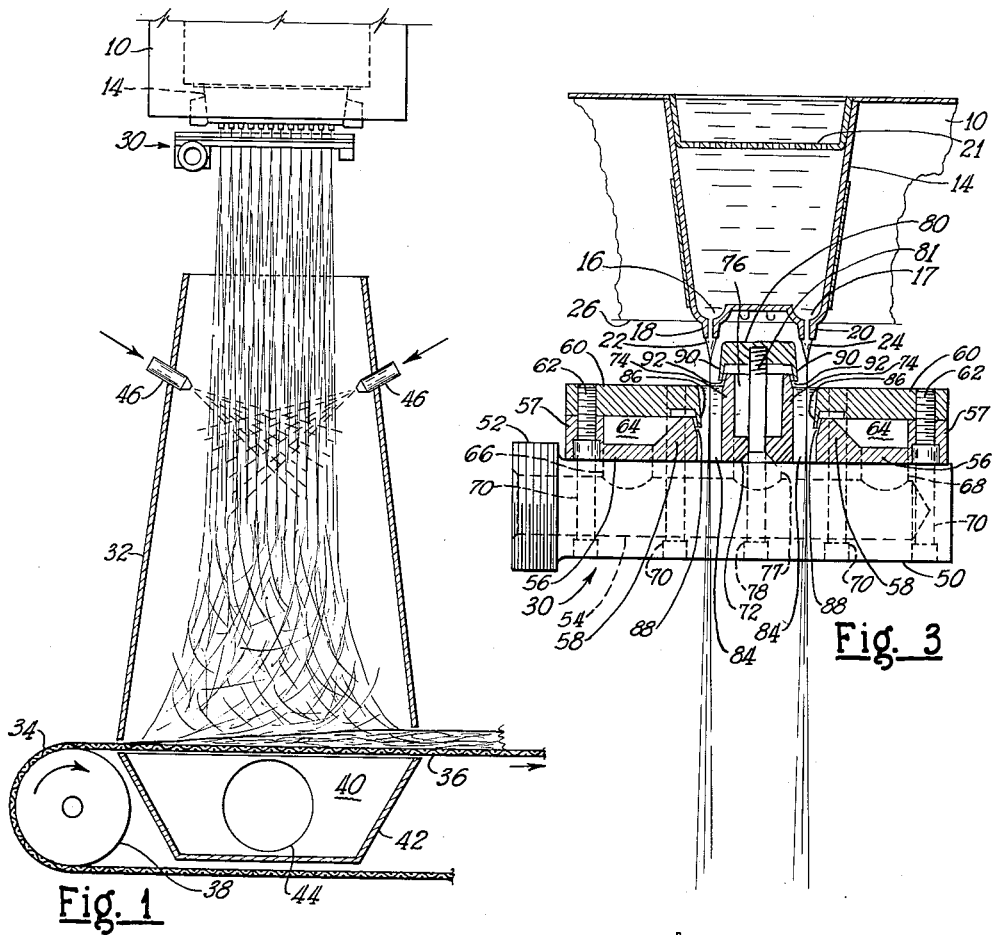
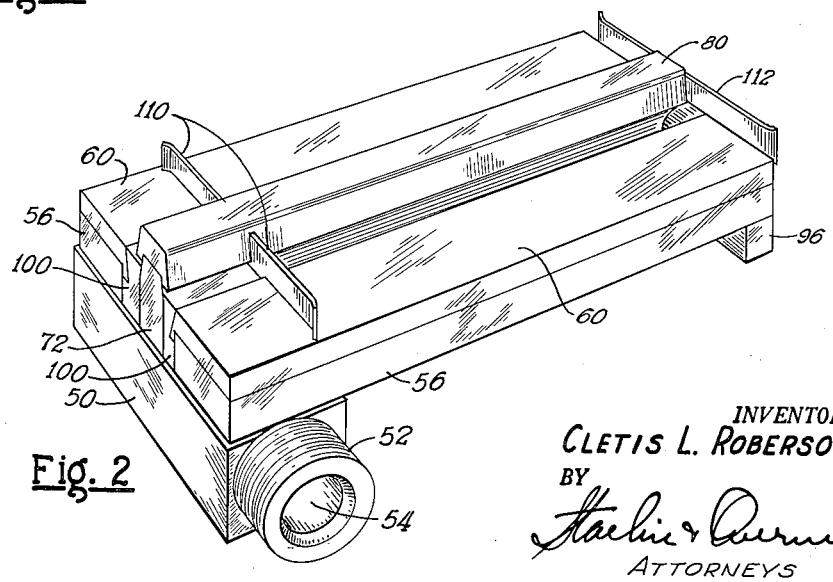
Fig. 1  Fig. 2  Fig. 3
INVENTOR.
CLETIS L. ROBERSON

INVENTOR.
CLETIS L. ROBERSON
BY
ATTORNEYS

Feb. 20, 1962   C. L. ROBERSON   3,021,558
METHOD AND APPARATUS FOR PRODUCING FIBERS
Filed May 15, 1959   3 Sheets-Sheet 3

INVENTOR.
CLETIS L. ROBERSON
BY
ATTORNEYS

United States Patent Office 3,021,558
Patented Feb. 20, 1962

3,021,558
METHOD AND APPARATUS FOR PRODUCING FIBERS
Cletis L. Roberson, Newark, Ohio, assignor to Owens-Corning Fiberglas Corporation, a corporation of Delaware
Filed May 15, 1959, Ser. No. 813,570
12 Claims. (Cl. 18—2.5)

The present invention relates to a method of and apparatus for producing fibers from heat-softenable materials and more particularly to the production of fibers by attenuation through the utilization of high velocity gaseous blasts.

Glass fibers have been produced commercially by attenuation through the use of high velocity gaseous blasts to form comparatively fine fibers used in the fabrication of mats, batts, textiles and various other uses. In such processes, attenuation of heat-softened glass is attained by directing blasts of steam, compressed air or other gases under pressure from nozzles or orifices arranged at the same level or horizontal plane, the blasts moving in slightly converging paths in the general direction of the flow of streams of heat-softened glass or other mineral material from which the fibers are formed. In such fiber forming process, which is particularly used for producing glass wool or mineral wool, the forces of the blasts and the blast-induced air stream set up a whipping action of the fibers during attenuation and the resulting fibers are not of a fineness and quality suitable for certain uses and purposes.

The process heretofore utilized for forming glass wool includes a blower for directing blasts of superheated steam from elongated orifices or nozzles at each side of a row or rows of glass streams through a slot or elongated passage means. The momentum of the air induced by the blasts effects lateral motion of the glass streams causing instabilities which result in whipping movements or vibrations of the fibers being attenuated from the streams and impairs the strength characteristics and quality of the fibers.

The present invention embraces the provision of a method of forming fibers by high velocity attenuating blasts wherein one blast is engageable with a group or row of streams of glass or other mineral material in advance of the engagement of a second blast with the group or row of streams providing more efficient attenuation and increased production of fine fibers of high quality having improved strength characteristics.

Another object of the invention resides in an arrangement for forming blast-attenuated fibers from streams of glass or similar mineral material wherein an abutment disposed at one side of a row of streams and elevated above the stream receiving passage or slot in a blower reduces and redirects flow of induced air generated by the velocity of the blasts in a direction along the streams whereby attenuation of the streams is effected in substantially rectilinear directions in the plane of the row of streams with a minimum of lateral movement of the streams or the fibers formed therefrom avoiding impinging of the streams or fibers against the surfaces defining the stream receiving passage.

Another object of the invention resides in a process or method of forming blast-attenuated fibers from rows of glass streams or other heat-softened mineral material wherein a raised central blower section is disposed between rows of streams and the high velocity gaseous blasts at opposite sides of a row of streams engaged with the streams at different heights, the raised section being effective to influence or energize the boundary layer of induced air preventing air layer separation whereby an improved condition of balance of the gaseous blasts and induced air is attained providing improved fiber attenuation.

Another object of the invention resides in a method of directing high velocity gaseous blasts along the sides of rows of glass streams with a raised central section between rows of the streams adapted to balance the induced air set up by the blasts projected from orifices or passages in the central raised section whereby the streams of glass in each row are drawn downwardly in rectilinear paths between adjacent gaseous blasts, assuring attenuation of the streams to fibers without impinging or blasting the streams or fibers against the blower surfaces.

Another object of the invention resides in impeding induced air flow at one side of a row of streams attenuated by downwardly directed blasts at opposite sides of the row of streams to provide air flow at comparatively low velocity adjacent the region of delivery of the streams from a feeder for cooling or reducing the temperature of the streams to increase the viscosity of the material and for redirecting blast-induced air so as to foster rectilinear attenuation of the streams to fibers and avoid impingement of the fibers against the adjacent blower surface.

Another object of the invention resides in interrupting or impeding blast-induced air flow at one side of a row of streams attenuated by blasts from a blower and establishing surfaces at the opposite side of the row of streams to set up vortices in the induced air stream in spaced regions to prevent separation of the boundary air layer across a surface of the blower where extremely high energy blasts are utilized to promote attenuation of the material in rectilinear paths and avoiding appreciable lateral movements or whipping of the fibers in the region of influence of the attenuating blasts.

Another object of the invention is the provision of a fiber-forming apparatus including blower means for directing attenuating gaseous blasts in the general direction of flow of streams of mineral material wherein a blower is provided with a raised section between rows of streams and the blower means provided with blast delivery passages at the inner sides of the rows of the streams arranged at a higher level than the gas passages at the outer sides of the streams whereby the blast-induced air streams are restricted and redirected to effectively balance forces of the blasts to an extent providing for rectilinear attenuation of the streams through the reduction or elimination of objectional turbulence in the attenuating region.

Another object of the invention is the provision of a blower construction especially adapted for directing gaseous blasts at opposite sides of rows of streams in vertically spaced regions whereby increased production yield of fibers is attained and fibers having increased strength characteristics produced without increasing the cross-sectional areas of the fibers.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an elevational view of a fiber-forming and fiber collecting apparatus embodying a novel blower construction for carrying out the novel method of the invention;

FIGURE 2 is a perspective view of a form of blower construction of the invention for directing gaseous attenuating blasts in engagement with rows of streams of fiber-forming material for attenuating the streams to fibers;

FIGURE 3 is a transverse sectional view showing the structural arrangement of the blower;

Figure 4:
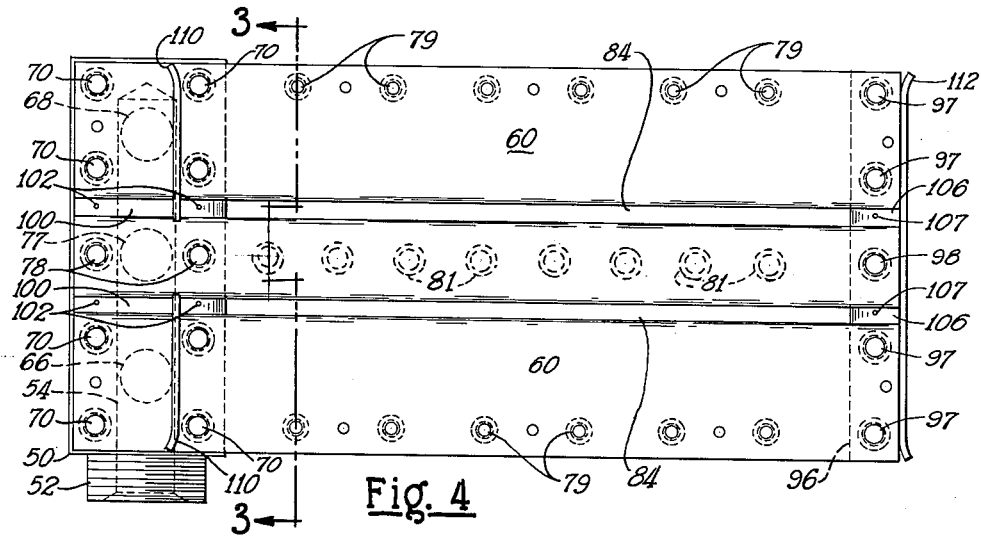
FIGURE 4 is a top plan view of the blower shown in FIGURE 2.

The method and apparatus of the invention are especially adaptable for use in attenuating multiple rows of streams of heat-softened material to fine fibers through the use of high velocity gaseous blasts and particularly for attenuating fibers from glass streams, but the invention may be utilized for attenuating or processing streams of other heat-softenable materials such as slag or fusible rock into fibers or for moving linear bodies at comparatively high speeds in rectilinear paths.

The forms of apparatus disclosed herein for carrying out the method are arranged to direct fiber attenuating blasts at opposite sides of a row or multiple rows of streams of material in a manner whereby a blast at one side of a row or group of streams is engaged with the streams in advance of the region of engagement of an attenuating blast at the opposite side of the row or group of streams of material.

Referring initially to FIGURE 1 of the drawings, there is illustrated a forehearth 10 adapted to contain a supply of heat-softened fiber-forming material such as glass. The forehearth may be connected with a melting furnace (not shown) in which glass batch or other mineral material is reduced to a heat-softened flowable condition by heat applied in the forehearth or receptacle 10.

The forehearth or receptacle 10 is made of refractory or other material suitable to withstand high temperatures and the lower wall or floor is provided with a stream feeder or bushing 14. The stream feeder may be used by itself and pieces or marbles of glass fed into the feeder and reduced to flowable condition in the feeder by electrical energy or other heating means. The stream feeder 14 illustrated in cross-section in FIGURE 3 is formed at its bottom region with trough-like portions 16 and 17 extending lengthwise of the feeder, each trough-like portion being provided with a row of tips or bushings designated 18 and 20. Heat-softened glass in the forehearth flows through a screen 21 in the feeder and the rows of bushings 18 and 20 deliver rows of streams 22 and 24 flowing downwardly from the feeder.

It should be noted that the lower surface 26 of the bottom or floor 10 of the forehearth lies in a plane slightly above the ends of the tips 18 and 20. The streams 22 and 24 flow downwardly into slots or passages in a blower construction 30 and are engaged by gaseous blasts in a manner hereinafter described and attenuating the streams to fibers which move into a fiber-forming hood 32.

Arranged beneath the fiber-forming hood 32 in an endless belt-type conveyor 34 of reticulated character, the upper flight 36 thereof moving through the base of the chamber 32 and the fibers collected thereon. The conveyor 34 is advanced by a supporting and driving roll 38 to continuously move the mass of collected fibers in a right-hand direction as viewed in FIGURE 1 away from the fiber-collecting hood 32.

A suction chamber 40 is provided by a receptacle 42 disposed beneath the upper flight 36 of the conveyor and in registration with the forming hood 32. A pipe 44 opening into the chamber 40 is connected with a suction blower or other source of reduced pressure to facilitate deposition of the fibers upon the conveyor and carry away the spent gases of the attenuating blasts. The walls of the fiber-forming chamber 32 are equipped with applicators 46 adapted to spray or deliver a binder or fiber-coating material upon the fibers moving through the fiber-forming hood or chamber 32.

One form of blower construction of the invention is illustrated in FIGURES 2 through 5. The form of blower illustrated is particularly adapted for directing high velocity steam blasts into engagement with the glass streams 22 and 24 to attenuate the glass to fibers, but it is to be understood that other gases, as for example compressed air or gases of combustion may be employed for the purpose. The blower is inclusive of a manifold or gas distributor block 50 having a threaded portion 52 for connection with a pipe (not shown) adapted to convey steam or other gas under pressure to the blower.

The manifold 50 extends transversely of the longitudinally extending stream feeder 14 and is formed with a manifold passage or chamber 54. Secured to the manifold 50 are longitudinally extending members or plates 56 arranged respectively at the outsides of the rows of streams 22 and 24, each member 56 being formed with upwardly extending portions 57 and 58. A cover plate or blower cap 60 is provided for each of the plates 56 and is secured thereto by means of screws 62. The regions defined by each pair of upwardly extending portions 57 and 58 and a cover plate 60 provide chambers 64 adapted to contain steam delivered into the chambers through passages or ports 66 and 68 in communication with the manifold chamber 54.

The body members or plates 56 and the cover plates 60 are secured to the manifold block 50 by screws 70. As particularly shown in the drawings, the blower sections or assemblies provided by plates 56 and 60 are spaced and disposed at the respective outer sides of the streams 22 and 24. Disposed between these assemblies is a central blower section comprising a body member 72 extending longitudinally in parallelism with the plates 56 and 60 and formed with upwardly extending walls 74 defining a chamber 76.

Disposed above and extending lengthwise of member 72 is a blower cap or cover 80 which is secured to the member 72 by screws 82 and defines an upper wall of the chamber 76. Member 72 and the blower cap 80 are secured to the manifold 50 by screws 78. The central chamber 76 receives steam or gas under pressure from the manifold chamber 54 through a passage or port 77. As shown in FIGURES 2 and 3, the member 80 extends upwardly above the upper surfaces of the cover plates or blower caps 60 of the outer blower sections.

The cover plates or blower caps 60 and the portions 58 are spaced from the respective side walls 74 of the central section providing passages or slots 84 into which the groups of glass streams are delivered from the feeder 14. The caps or members 60 adjacent the slots 84 are formed with depending skirt portions 86 which are spaced transversely from the portions 58 of members 56 providing orifices or passages 88 through which steam or other gas under pressure contained in chambers 64 is projected at high velocities, forming high velocity attenuating blasts, the gases of the blasts moving downwardly in the general direction of flow of glass streams 22 and 24 at the outer sides of the rows of streams.

The outer surfaces of the wall portions 74 of the central section define respectively the inner walls of the passages or blower slots 84. The blower cap or cover 80 of the central section 72 has depending longitudinally extending skirt portions 90 which are spaced from upper portions of the walls 74 to form longitudinally extending orifices or passages 92 through which steam or other gas under pressure from the central chamber 76 is projected at high velocities in a generally downward direction through the slots or passages 84 and into attenuating engagement with the glass streams 22 and 24.

As shown in FIGURE 3, the blower cap of the central section of the blower construction extends upwardly a substantial distance above the upper surfaces of the cover plates 60 and terminates a short distance beneath the plane of the surface 26 of the refractory 10 adjacent the tips or feeding bushings 18 and 20.

For the average size blower, it is found that the upper surface of the blower cap 80 should preferably be disposed close to the lower surface 26 of the refractory 10 and about thirteen thirty-seconds of an inch or more above the plane of the upper surfaces of the blower caps 60 at the sides of the central section. The arrangement may be modified for use with glasses having various properties as well as for different types of attenuating gases employed with the blower.

Figure 5:
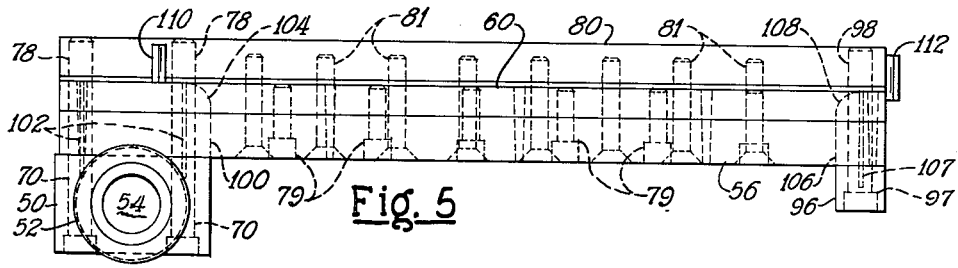
FIGURE 5 is an elevational view of the blower construction shown in FIGURE 4.

Extending transversely of the blower assembly at the ends of the plates spaced from the manifold block 50 is a bar 96, shown in FIGURES 2, 4 and 5, secured to the plates 56 by means of screws 97 and to the central member 72 and blower cap 80 by means of a screw 98. It will be seen from FIGURE 4 that the stream receiving passages or slots 84 are in parallel relation and that the streams of glass of the rows are delivered into the median or central region of each passage.

Arranged between the central section member 72 and the blower covers 60 are members or blocks 100, shown in FIGURE 4, which are secured to the manifold 50 by means of pins or dowels 102. The portions of the blocks 100 bounding or defining the ends of the slots or passages 84 adjacent the manifold 50 are curved downwardly as shown at 104 in FIGURE 5. The regions between the opposite ends of members 60 and the central member 72 are provided with blocks or members 106 held in place by means of pins 107 extending into openings formed in the bar 96. The surfaces 108 of the blocks 106 are curved downwardly as shown in FIGURE 5.

Screws 79 secure the cover plates 60 to the members 56 at their intermediate regions and screws 81 secure the cover plate 80 to the central section member 72. In the operation of the blower construction as shown in FIGURES 1 through 5, preferably superheated steam under pressure is delivered into the manifold chamber 54 from a supply and flows through the ports 66, 68 and 77 into the outer blower chambers 64 and the chamber 76 in the central section.

Steam in the central chamber 76 is projected through the orifices or passages 92 forming high velocity blasts directed downwardly into the passages 84 and in engagement with the rows of streams 22 and 24. Steam from chambers 64 is projected or delivered through the passages or orifices 88 to form high velocity blasts directed downwardly through the passages 84 and engaging the streams of the rows 22 and 24. The gaseous blasts from the orifices 88 and 92 engage and draw out or attenuate the streams of the rows into fine fibers.

The raised or elevated position of the blower cap 80 and the regions of delivery of the inner and outer attenuating blasts into the passages 84 being at different levels or vertically spaced modifies and controls the air streams moving into the passages 84 across the blower caps 60 under the influence of the high velocity blasts in a manner whereby improved attenuation, increased fiber yield of fibers having higher strength characteristics and other advantages are attained by use of this method. The elevated or raised position of the blower cap 80 of the central section disposed between the rows of glass streams substantially eliminates a region of reduced pressure which would otherwise be established between the rows of streams under the forces generated by the high velocity blasts.

By reason of the elevated central section of the blower, a control of the direction of potential flow of the induced air along the streams is attained so that the momentums are in proper balance. The high velocity gaseous blasts from the orifices 88 disposed at a lower level than the orifices 92 do not impair the rectilinear or smooth flow of induced air along the streams and thus substantially vertical rectilinear attenuation of the streams to fibers is attained.

In this arrangement, the induced air stream in each passage is influenced by the upper blast from the orifice 92 so that its momentum in a direction toward the blower cap 80 is reduced and to a substantial extent is balanced by the downward forces of the blast bending the stream of induced air into the passage 84.

The path of the air stream downwardly into the passage 84 is therefore substantially rectilinear and laterally acting forces are thus eliminated or reduced, a factor which, in prior processes caused whipping or impinging of the fibers against the sides of the glass receiving passages or blower slots. Apparently due to the elimination of lateral forces tending to blast the fibers against the sides of the passages, a much higher production of fibers is attained and the strength of the fibers greatly increased without any increase in fiber size.

In this method, the induced air flow is restricted by the central raised section to one side of a row of glass streams and is redirected into the blower slot by the uppermost blast and the momentum of the air stream across a blower cap 60 impeded by the raised central section of the blower construction.

As the second blast from the orifice or passage 88 at the outside of the row of streams moves downwardly, its velocity influences the induced air to continue to flow in a rectilinear direction whereby the attenuation of the streams to fibers occurs in the central region of the passage 84 so that the attenuated fibers do not contact the walls of the passage 84. Through the use of the method, it has been found that the fiber production per unit of the energy expended is increased approximately 15-20% and that the strength of the fibers on an average is increased about 28% as compared with the strength of the same size fibers produced by conventional steam blower apparatus.

The curved surfaces 104 and 108 of the blocks or air guides 100 and 106 at the ends of the blower slots are effective to control the path of flow of induced air at the end regions of the passages 84 by reducing the radial velocity gradient. Since momentum is a function of the square of the velocity, the main momentum vector of the induced air is downward. Heretofore in steam blowers employed for fiber attenuation wherein the blasts are discharged from orifices in a common horizontal plane, the induced air stream at the end region of the blower slots or passages attains momentum of an amplitude to divert the streams toward the central region of the blower slot or causes "break outs" of the end streams of the row.

In the present arrangement wherein a first blast is engaged with the row of streams at a level above a second blast, it is found that for blast velocities utilized for producing fine fibers that the curvature of the surfaces 104 and 108 provides regions diverting the induced air streams gradually downwardly at the ends of the blower slots 84 so that there is little or no deviation of the end streams of a row from rectilinear paths and the streams drawn into fibers with a minimum liability of the streams being broken.

Where the arrangement of the invention is utilized for attenuating glass streams of higher flow rates to fibers utilizing extremely high velocity, high energy blasts, the control of the induced air streams at the ends of the blower slots or passages 84 may be further controlled through the use of baffle means. As shown in FIGURE 2, baffle members or plates 110 and 112 may be employed in conjunction with the curvature of surfaces 104 and 108 to further restrict the movement of induced air from the end regions of the blower into the passages or blower slots 84.

It will be noted from FIGURE 2 that the baffle members 110 and 112 extend transversely a distance substantially equal to the width of the side blower sections to foster induced air flow transversely of the blower with a minimum of interference of induced air at the end regions of the blower. The baffle plates 110 and 112 are preferably made readily removable to accommodate the use of the blower with glass feeders having different feed rates and blasts of different velocities.

Figure 6:
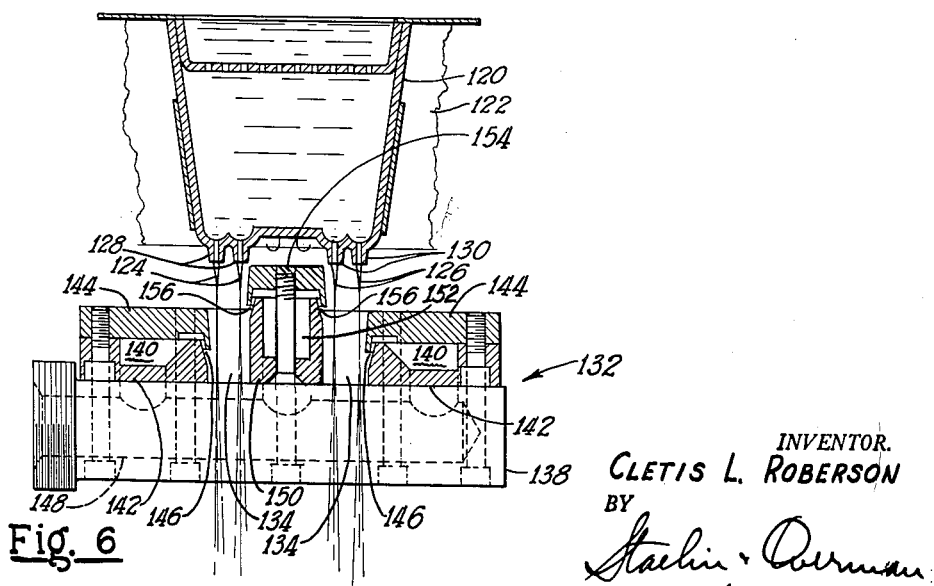
FIGURE 6 is a sectional view illustrating a blower construction arranged to accommodate double rows of streams of fiber-forming material providing pairs of blasts for each pair of rows.

FIGURE 6 is a transverse sectional view illustrating a feeder construction arranged to flow pairs of double rows of glass streams wherein two rows of streams are delivered into a single blower slot or passage and the streams of both rows attenuated to fibers by a blast arranged at each side of dual rows of streams. In this arrangement, a feeder 120 is mounted in a forehearth floor 122 formed of refractory, the feeder being adapted to flow two double rows of streams 124 and 126, the streams 124 flowing from two rows or orificed tips or bushings 128 and the streams 126 flowing from two rows of orificed tips or bushings 130. The tips of adjacent rows are preferably arranged in staggered relation.

The blower arrangement 132 is of substantially the same construction as the blower illustrated in FIGURE 3 except that the blower slots or passages 134 are each of a width to accommodate a double row of streams of glass. The blower 132 includes a manifold 138 to which is secured the components forming the blower construction. The chambers 140 of the blowers at the side regions are formed by plate or body members 142 and blower cap members 144.

The cap members and portions of the plates 142 are configured to provide longitudinally arranged passages or orifices 146 through which blasts of steam or other gases moving at high velocities are projected forming high velocity blasts at the outer sides of the double rows of streams, the chambers 140 receiving steam under pressure from a common manifold chamber 148. The blower construction 132 is provided with a raised or elevated central section comprising a member 150 formed with upwardly extending walls defining a chamber 152, member 150 being provided with a blower cap 154.

Portions of the member 150 and 154 are configured to provide orifices 156 through which steam or other gas under pressure in chamber 152 is discharged to form high velocity blasts at the inner sides of each double row or group of streams. The orifices 156 are arranged slightly above the plane of the upper surfaces of covers or caps 144 while the orifices 146, as in the form shown in FIGURE 3, are arranged at a level substantially below that of the orifices 156.

In this form of the invention, each pair of blasts from a set of orifices 146 and 156 engage dual rows of glass streams flowing into a single slot or passage 134 and are attenuated to fibers by the blasts emanating from orifices at different levels. Through this arrangement a substantial increase in fiber production is effected in relation to the amount of energy expended by the blasts in attenuating the streams to fibers.

The method of operation of the arrangement shown in FIGURE 6 is the same as the method of operation of the arrangement shown in FIGURE 3 except that each pair of blasts engages two rows of streams flowing through each blower slot or passage 134. The elevated position of the blower cap 154 of the central section restricts the flow of induced air from regions across the blower caps 144 at the outer sides of each double row of glass streams.

In this form the forces of the blast from an upper orifice 156 are effectively balanced by induced air flow from one side of the blower as explained in the method of operation of the construction shown in FIGURE 3 to establish rectilinear flow of the induced air through a blower slot with a minimum of turbulence whereby the streams of glass are stabilized for movement and attenuation to fibers in a rectilinear path. The use of the arrangement shown in FIGURE 6 produces fibers having high strength characteristics and substantially greater economies are effected as the energy of a pair of blasts attenuating dual rows of streams produces a much higher yield of fibers in comparison to the energy expended by the blasts.

In the manufacture of certain types of fibers attenuated from glass, slag or fusible rock particularly usable for bulk insulation or comparatively thick batts, it is desirable to utilize blasts of very high velocities in order to secure a high production yield although the fibers are not as fine as those attenuated by this method through the use of blasts of lesser velocities.

In prior methods of fiber attenuation where extremely high velocity steam blasts are utilized, such blasts generate or establish increased velocity and volume of induced air flowing into the blower slots or passages causing excessive lateral whipping or movement of the fibers in the blower slots, causing them to be blasted against the sides of the slots. Furthermore, the high velocity induced air set up by a pair of blasts delivered from orifices in a common horizontal plane establishes turbulence which impairs the strength characteristics of the attenuated fibers as well as reducing the yield for the energy expended.

Figure 7:
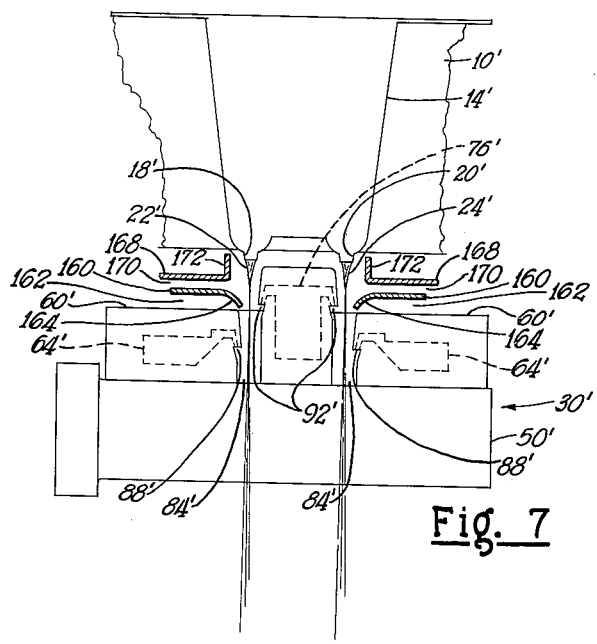
FIGURE 7 is a sectional view illustrating a blower construction of the invention associated with baffle means for restricting and controlling the direction of flow of blast-induced air and stream cooling air for use with high energy attenuating blasts.
Figure 8:
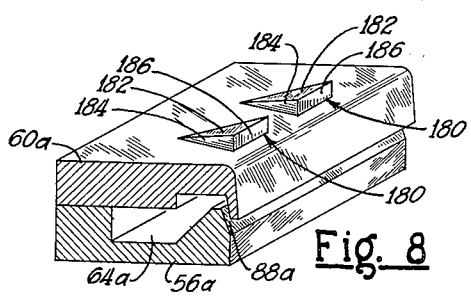
FIGURE 8 is an isometric view of a portion of a blower section embodying air redirectioning means spaced lengthwise of the blower for minimizing separation of the boundary air layer of the blast-induced air stream adjacent the blower.
Figure 9:
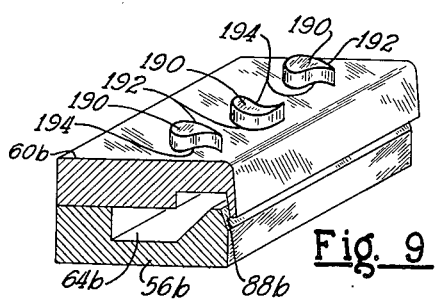
FIGURE 9 is a view similar to FIGURE 8 embodying a modified form of air redirectioning means associated with the blower.

FIGURE 7 illustrates an arrangement for controlling and redirecting the flow path of blast-induced air for securing the attenuation of streams to fibers in a rectilinear path by reducing the momentum of a portion of the induced air as it enters a blower slot and directing air in the region of the stream feeder tips or orifices to cool or reduce the temperature of the cones of glass at the tips from which the fibers are attenuated.

With particular reference to FIGURE 7, the feeder 14' is provided with two rows of feeder tips or orificed portions 18' and 20' through which flow streams of glass 22' and 24'. Disposed beneath the feeder 14' is a blower construction 30' of the same type as that shown in FIGURE 3. The blower 30' is formed with a manifold portion 50' adapted to be connected with a source of gas under pressure such as superheated steam, the blower construction including transversely spaced chambers 64' which are supplied with steam from the chamber in the manifold member 50' and the steam projected at high velocity through the elongated orifices 88' into the blower slots or passages 84'.

The central raised section is provided with a chamber 76', receiving superheated steam from the chamber in manifold member 50' and the steam delivered through the elongated orifices 92' which are at a higher level than the orifices 88' to engage the glass streams 22' and 24'. Disposed above the blower caps 60' of the blower construction at each side of the central section is a baffle or guide member 160, the vertical space 162 between each of the blower caps 60' and a baffle 160 providing a passage through which blast-induced air is directed into each passage 84'.

The region of each baffle adjacent a blower slot 84' is formed with a downwardly turned or curved portion 164. The curved portions 164 provide abutments for changing the direction of the induced air stream moving through each space 162 by deflecting or guiding the induced air stream downwardly and thereby reducing the momentum of the moving air.

Through the exercise of a control of the blast-induced air stream by the members 160, the induced air stream provides forces balancing the forces of the blasts 92' whereby a rectilinear or stream-like flow of induced air occurs in the blower slots 84' to effect rectilinear attenuation of the streams in the central regions of the blower slots, avoiding lateral impingement or blasting of the fibers against the walls defining the slots 84'.

The arrangement shown in FIGURE 7 includes a secondary guide means in the form of baffles or guide members 168 which have portions in substantial parallelism with planar portions of the members 160 defining passages 170. The guide members 168 have upwardly extending wall portions 172 which terminate adjacent the refractory body 10' to obstruct air flow between the refractory 10' and the horizontal portions of members 168.

The passages 170 facilitate flow of air into the region of the streams at their zone of delivery from the tips 18' and 20' for cooling or reducing the temperature of the streams rendering the material more viscous to facilitate effective attenuation of fibers from the streams. The air moving through the passages 170 is at a lower momentum than that of the air moving through passages 170" so that such air does not disturb the rectilinear path of travel of the streams and fibers formed therefrom in the blower slots 84'.

FIGURES 8 and 9 illustrate modifications of impediments or baffle means for restricting or modifying the flow of blast-induced air where comparatively high gas velocities are employed for fiber attenuating purposes in order to attain rectilinear attenuation of the streams by maintaining an effective balance of the forces of the attenuating blasts and the induced air streams.

With particular reference to FIGURE 8, the blower construction is of the character employed at the outer sides of rows of streams and is of the character shown in FIGURE 3 embodying a body portion *56a* provided with a cap member *60a* providing a steam or gas chamber *64a* and an elongated gas discharge orifice or passage *88a*. Disposed upon the upper surface of the cap member *60a* is a plurality of longitudinally spaced impediments or abutments 180 which have upwardly inclined ramp surfaces 182 and triangularly shaped angularly divergent side surfaces 184.

In the embodiment illustrated in FIGURE 8, the abutments 180 are of rectangular cross-section, their greatest width being at the end faces 186 disposed adjacent a blower slot, one wall of which is defined by the body *56a* and the cap member *60a*. The pairs of angularly divergent side surfaces 184 of adjacent abutments 180 provide a progressively restricted passage toward the blower slot between adjacent abutments to influence the layer of induced air moving across and adjacent the upper surface of the blower cap 68.

The abutments 180 provide vortex generators which influence the air moving between adjacent abutments to move in generally spiral or involutional paths by reason of differential pressure due to the configuration of the abutments. Such modification of the flow of blast-induced air reduces the tendency for delamination of the boundary air layer adjacent the blower cap and reduces the momentum of the air in a direction which would otherwise blast or impinge the fibers against the walls of the blower slot or passage and fosters a generally rectilinear attenuation of the streams.

FIGURE 9 illustrates a blower construction of the type shown in FIGURE 8 showing a modified form of induced air redirectioning means. The blower illustrated includes a body member *56b* provided with a cap *60b*, the body and cap being configurated to provide the elongated orifice *88b* through which steam or other gas from a chamber *64b* is projected forming an attenuating blast.

Mounted upon the upper surface of the blower cap *60b* is a plurality of abutments of air stream impediments 190 in longitudinally spaced relation. Each of the abutments 190 is configurated with a curved surface 192 and an ogee surface 194. As shown in FIGURE 9, the ogee surfaces 194 of adjacent abutments are in adjacent opposed relation and the curved surfaces 192 in adjacent opposed relation. Due to the particular curvature or shape of the abutments 190, one set of passages between adjacent abutments is of one shape and the alternate set of a different shape.

The abutments in the path of the induced air stream adjacent the upper surface of the cap *60b* form vortex generators and influence the air to move in generally spiral or diverted paths by reason of pressure differentials. This modification of the moving air induced by the blast diverts the air from its normal path of movement across the blower cap effecting a balance of forces as not to impair the rectilinear flow of the glass streams through a blower slot.

Through the employment of abutments of the character shown in FIGURES 8 and 9 where extremely high velocity attenuating blasts are utilized, the induced air flow is modified so that a high production yield of fibers is attained and at the same time impingement or blasting of the fibers against the sides of the blower slots is eliminated. This method of fiber attenuation fosters increased flow of glass for attenuation without increasing the energy required for attenuation and the fibers produced are of high quality and have improved strength characteristics.

It is believed that these advantageous properties in the fibers are attained through the method of control of the induced air streams at one side of a row of glass streams and substantially eliminating air flow at the opposite side of the row through the use of the raised center section and wherein the blast orifices are arranged at different levels and the initial engagement of the blasts with the fibers occurs in vertically spaced regions.

It is apparent that, within the scope of the invention, modifications and different arrangements may be made other than is herein disclosed, and the present disclosure is illustrative merely, the invention comprehending all variations thereof.

I claim:

1. The method of forming fibers from heat-softened mineral material including flowing streams of the material in spaced rows from a supply through walled passages, engaging the material of the streams in each passage with a first gaseous blast discharged from an orifice in the inner wall of each passage, engaging the material of the streams in each passage with a second gaseous blast discharged from an orifice in the outer wall of each passage at a lower region than the zone of engagement of the first blast with the material, and obstructing the flow of blast-induced air at the region between the passages.

2. The method of forming fibers from heat-softened mineral material including flowing streams of the material in spaced rows from a supply through walled passages, engaging the material streams in each passage with a first gaseous blast, engaging the material of the streams in each passage with a second gaseous blast at a lower region than the zone of engagement of the first blast with the material, and obstructing the flow of blast-induced air at the region between the passages.

3. The method of forming fibers from heat-softened mineral material including flowing a row of streams of the material from a supply through each of two spaced passages, engaging the streams in each passage with a first high velocity gaseous blast at one side of the row of streams with the gases of the blast moving in the general direction of flow of the streams, and engaging a second high velocity gaseous blast with the opposite side of each of the rows of streams at a different level from the region of engagement of the first blast with each of the rows of streams whereby the blasts attenuate the streams of the rows to fibers, and substantially balancing the forces of the first blasts by blast-induced air flow restricted to enter the passages from regions adjacent and opposite the zones of delivery of the first blasts.

4. The method of forming fibers from heat-softened mineral material including flowing two groups of streams of material from a supply through two spaced walled passages, engaging the material of each group of streams with first gaseous blasts, engaging the material of each group of streams with second gaseous blasts at lower regions than the zones of engagement of the first blasts with the groups of streams of material, obstructing blast-induced air flow between the groups of streams, and diverting the blast-induced air flow into the walled passages at regions opposite the sources of the first gaseous blasts to modify the directions of the forces of the first blasts and effect substantially rectilinear attenuation of the groups of streams by the blasts.

5. The method of forming fibers from heat-softened mineral material including flowing spaced rectilinear rows of streams of the material from a supply through spaced walled passages, engaging the rows of streams with a first pair of high velocity gaseous blasts projected from orifices in the inner walls of the passages, engaging the rows of streams with a second pair of high velocity gaseous blasts projected from orifices in the outer walls of the passages at a lower region than the zone of engagement of the first pair of blasts with the streams, guiding blast-induced air flow into each passage from a lateral direction toward the inner wall of each passage, and obstructing air flow from a region above and between the passages.

6. The method of forming fibers from heat-softened mineral material including flowing spaced rectilinear rows of streams of the material from a supply through spaced walled passages, engaging the streams in the passages with a first pair of high velocity gaseous blasts projected from orifices in the inner walls of the passages, engaging the rows of streams with a second pair of high velocity gaseous blasts projected from orifices in the outer walls of the passages at a lower region than the zone of engagement of the first pair of blasts with the streams, obstructing air flow in a region above and between the passages, diverting a portion of blast-induced air into each passage from a lateral direction toward the inner wall of each passage whereby the diverted air enters the passages at the regions of the first pair of blasts, and directing another portion of blast-induced air into contact with the streams of material above the regions of the first pair of blasts for reducing the temperature of the material of the streams prior to engagement of the first pair of blasts with the streams.

7. The method of forming fibers from heat-softened mineral material including flowing spaced rectilinear rows of streams of the material from a supply through spaced walled passages, engaging the streams in the passages with a first pair of high velocity gaseous blasts projected from orifices in the inner walls of the passage, engaging the rows of streams with a second pair of high velocity gaseous blasts projected from orifices in the outer walls of the passages at a lower region than the zone of engagement of the first pair of blasts with the streams, obstructing air flow at the ends of the passages, obstructing air flow in a region above and between the passages, flowing blast-induced air into each passage from a lateral direction toward the inner wall of each passage whereby the air enters the passages at the regions of the first pair of blasts, and modifying the lateral paths of air flow at spaced zones adjacent the entry of the air into the passages.

8. Apparatus for producing fibers from heat-softenable material including, in combination, means for feeding spaced groups of streams of the material from a supply, a blower disposed adjacent and beneath the stream feeding means, said blower being formed with a stream receiving passage for each group of streams, a portion of the blower at one side of each passage extending above the portion of the blower at the opposite side of each passage, chambers formed in the portions of the blower at both sides of each of the passages adapted to contain gas under pressure, the walls of the portions of the blower defining the stream receiving passages being formed with outlets through which gas is discharged from said chambers as high velocity blasts adapted to engage and attenuate the material of the streams to fibers, the outlets for each passage being arranged in vertically spaced relation whereby the gases of the blasts engage the material of the groups of streams in vertically spaced regions in each passage.

9. Apparatus for producing fibers from heat-softenable material including, in combination, means for feeding rows of streams of the material from a supply with the rows in parallel spaced relation, a blower construction disposed adjacent and beneath the stream feeding means, said blower being formed with spaced slots to receive respectively the spaced rows of the streams, said blower having a portion between the rows of streams extending upwardly above the portions of the blower at the outer sides of the rows of streams, chambers formed in the upwardly extending portion and the portions at the sides of the streams adapted to contain gas under pressure, said upwardly extending portion and said side portions being formed with passages through which gas is discharged from said chambers as high velocity blasts adapted to engage and attenuate the material of the streams to fibers, the gas discharge passages in the portion of the blower between the rows of streams being in a horizontal plane spaced vertically from the horizontal plane of the passages in the side portions of the blower.

10. Apparatus for producing fibers from heat-softenable material including, in combination, means for feeding rows of streams of the material with the rows in parallel spaced relation, a blower disposed adjacent and beneath the stream feeding means, said blower being formed with spaced parallel elongated slots to receive spaced rows of the streams, said blower having a portion between the rows of streams elevated above the portions of the blower at the outer sides of the rows of streams, said elevated portion terminating adjacent the feeder, chambers formed in the elevated portion and the portions at the sides of the streams adapted to receive gas under pressure from a supply, said elevated portion and said side portions being formed with elongated restricted orifices through which gas is discharged from said chambers as high velocity blasts adapted to engage and attenuate the material of the streams to fibers, the orifices in the elevated portion of the blower between rows of streams lying substantially in the plane of the upper surfaces of the blower side portions whereby blast-induced air enters the slots at the region of delivery of the gases from the orifices in the elevated portion of the blower.

11. Apparatus for producing fibers from heat-softenable mineral material including, in combination, a feeder having a bottom wall formed with orifices for flowing rows of streams with the rows in transversely spaced parallel relation, a blower means disposed adjacent and beneath the stream feeder, said blower having a central section and sections adjacent and spaced from the central section at each side thereof defining passageways each adapted to receive at least one row of streams, the central section being raised above the side sections and disposed between rows of the streams, the upper surface of the central section terminating adjacent the bottom wall of the feeder to obstruct air flow into the passageways from a region between the passageways, chambers formed in the central and side sections, manifold means for supplying gas under pressure from a supply to said chambers, the inner and outer wall of each passageway being formed with an elongated passage through which gas is discharged from the chambers forming high velocity blasts adapted to engage and attenuate the material of the streams to fibers, the gas discharge passages in the inner walls lying substantially in a horizontal plane of the upper surfaces of the side sections of the blower, the gas discharge passages in the outer walls of the passageways lying in a plane parallel with and below the plane of the passages in the central section.

12. Apparatus for producing fibers from heat-softenable mineral material including, in combination, a feeder having a bottom wall formed with orifices flowing pairs of rows of streams with the pairs being in transversely spaced parallel relation, a blower means disposed adjacent and beneath the stream feeder, said blower having a central portion and portions adjacent and spaced from the central portion at each side thereof defining passageways, each passageway being adapted to receive two rows of streams, the central portion being raised above the side portions and disposed between pairs of rows of the streams, chambers formed in the central and side portions, manifold means for supplying gas under pressure to said chambers, the inner and outer wall of each passageway being formed with an elongated restricted outlet through which gas is discharged from the chambers as high velocity blasts adapted to engage and attenuate the material of the streams to fibers, the gas discharge passages in the inner walls and the upper surfaces of the side portions of the blower means being substantially in a common plane, the upper surface of the central section being disposed close to the feeder to restrict blast-induced air flow from regions laterally and across the upper surfaces of side portions of the blower means, the gas discharge outlets in the outer walls of the passageways being arranged below the outlets in the inner walls whereby the blasts in each passageway engage the material at spaced vertical regions.

References Cited in the file of this patent
UNITED STATES PATENTS

| | | |
|---|---|---|
| 2,136,158 | Thomas | Nov. 8, 1938 |
| 2,206,060 | Slayter | July 2, 1940 |
| 2,774,630 | Henry et al. | Dec. 18, 1956 |

FOREIGN PATENTS

| | | |
|---|---|---|
| 848,990 | Germany | Sept. 11, 1952 |